United States Patent [19]
Papke et al.

[11] Patent Number: 5,636,703
[45] Date of Patent: Jun. 10, 1997

[54] ROTARY AXLE-MOUNTED FEEDBACK TRANSDUCER

[75] Inventors: Clark S. Papke, Elwood, Nebr.; Francis E. Schlueter, Des Moines, Iowa; William E. McCoy, Ankeny, Iowa; Timothy A. Deutsch, Newton, Iowa

[73] Assignees: Deere & Company, Moline, Ill.; Orthman Manufacturing Co., Lexington, Nebr.

[21] Appl. No.: 490,002

[22] Filed: Jun. 12, 1995

[51] Int. Cl.⁶ .................... B62D 1/00; A01D 3/00
[52] U.S. Cl. ............ 180/400; 56/10.2 F; 180/446
[58] Field of Search .................... 56/15.4, 15.5, 56/10.2 F; 73/866.1; 180/400, 421, 422, 446; 384/448, 542, 544

[56] References Cited

U.S. PATENT DOCUMENTS

| | | | |
|---|---|---|---|
| 4,166,349 | 9/1979 | Coenenberg et al. | 56/10.2 |
| 4,505,094 | 3/1985 | Demorest | 56/10.2 |
| 4,528,804 | 7/1985 | Williams | 56/10.2 |
| 4,529,348 | 7/1985 | Johnson et al. | |
| 4,663,918 | 5/1987 | Williams et al. | 56/10.2 |
| 4,727,950 | 3/1988 | Shimizu et al. | 180/446 |
| 4,754,829 | 7/1988 | Shimizu | 180/446 |
| 4,934,473 | 6/1990 | Fushimi et al. | 180/446 |
| 4,967,858 | 11/1990 | Kotake et al. | 180/446 |
| 5,103,924 | 4/1992 | Walker | 180/131 |
| 5,381,705 | 1/1995 | Takahashi | 180/412 |
| 5,445,237 | 8/1995 | Eda et al. | 180/446 |

FOREIGN PATENT DOCUMENTS 113684  6/1980  Germany.

OTHER PUBLICATIONS

Orthman Manufacturing, Orthman brochure entitled "MP-11 Tracker Automatic Guidance System", 4 pages, dated 1990, published in the U.S.A.
Orthman Manufacturing, Orthman parts manual, pp. 36 and 51, date unknown, published in the U.S.A.

*Primary Examiner*—Brian L. Johnson
*Assistant Examiner*—Gary Savitt

[57] ABSTRACT

Transducer structure for a steerable axle includes a transducer assembly having a housing and a cup-shaped journal, having an apertured bottom portion, fixed to the spindle of a steerable wheel by the spindle bolt for rotation with the spindle about the spindle axis. A bracket connected to the guide axle knee nonrotatably supports housing structure above the spindle, and the journal is rotatably received within a bearing and seal in the housing structure. The journal includes apertures which receive mating pins which constrain the rotary member for rotation with the journal relative to the housing structure. A special fixture supported by the tie-rod bolt accurately centers the journal during assembly and facilitates calibration of the transducer.

20 Claims, 3 Drawing Sheets

5,636,703

ROTARY AXLE-MOUNTED FEEDBACK TRANSDUCER

BACKGROUND OF INVENTION

1) Field of the Invention

The present invention relates generally to steering control systems for agricultural equipment, and more specifically to a mounting arrangement for a feedback transducer for use in such systems.

2) Related Art

Various types of steering control systems for tractors and harvesting equipment are available which include a transducer or feedback device such as a potentiometer connected to the steering mechanism to provide a signal dependant on the position of steerable wheels. Some steering control systems include a linear potentiometer with linkage for operating the potentiometer as the vehicle is steered. Such systems are often difficult to mount and calibrate, and looseness that is often present in the linkage can cause loss of accuracy and repeatability of the feedback signal. Although other arrangements have been suggested for mounting a rotary potentiometer on the axis of the spindle which supports the steerable wheel or wheels, these have for the most part required relatively complex mountings or mountings with numerous components. Mounting and calibrating such feedback systems, and fitting such systems on existing steering mechanisms without substantial modifications present additional difficulties.

BRIEF SUMMARY OF THE INVENTION

It is therefore an object of the present invention to provide an improved steering feedback arrangement which overcomes at least most or all of the aforementioned problems.

It is another object of the present invention to provide an improved steering feedback arrangement which is simple and compact in construction and easy to mount and calibrate. It is a further object To provide such a feedback arrangement which facilitates accurate and repeatable position feedback signals. It is still another object to provide such an arrangement which may be easily retrofitted to existing steerable wheel assemblies.

It is a further object of the present invention to provide a unique journal mounting arrangement for attaching a rotary transducer to the spindle member of a steerable axle assembly. It is a further object to provide such a mounting arrangement is easy to attach and align.

It is yet another object to provide a journal mounting arrangement for attaching a rotary transducer to the spindle member of a steerable axle assembly which requires a minimal number of parts and wherein relatively rotating parts are journalled in a low friction and contaminant resistant housing. It is a further object to provide such an arrangement wherein a journal is attached directly to the top of a steering spindle member and wherein a simple alignment fixture assures quick mounting of the journal and accurate alignment of the rotary transducer.

In accordance with the above objects, transducer structure for a steerable axle includes a transducer assembly having a housing and a rotary member journalled in the housing. A cup-shaped journal having an apertured bottom portion is connected to the spindle of a steerable wheel for rotation with the spindle about the upright axis of the spindle. A bracket connected to the axle frame nonrotatably supports housing structure above the spindle, and the journal is rotatably received within a bearing in the housing structure. The journal includes indexing apertures which receive mating pins to constrain the rotary member for rotation with the journal relative to the housing structure. A fixture mounts on the threaded end of the bolt connecting the tie rod to the steering arm, and a wrench which mates with the indexing apertures during assembly cooperates with the fixture to position the journal quickly and accurately and facilitate calibration.

The transducer assembly with direct mounting of the journal on the spindle has relatively little looseness and provides an accurate and repeatable transducer output signal. The structure is simple, compact and easy to mount, even on existing steerable wheel assemblies. A minimal number of parts are required. Relatively rotating parts are journalled and sealed in a low friction and contaminant resistant housing for increased reliability and extended life.

DETAILED DESCRIPTION OF THE DRAWINGS

Figure 2:
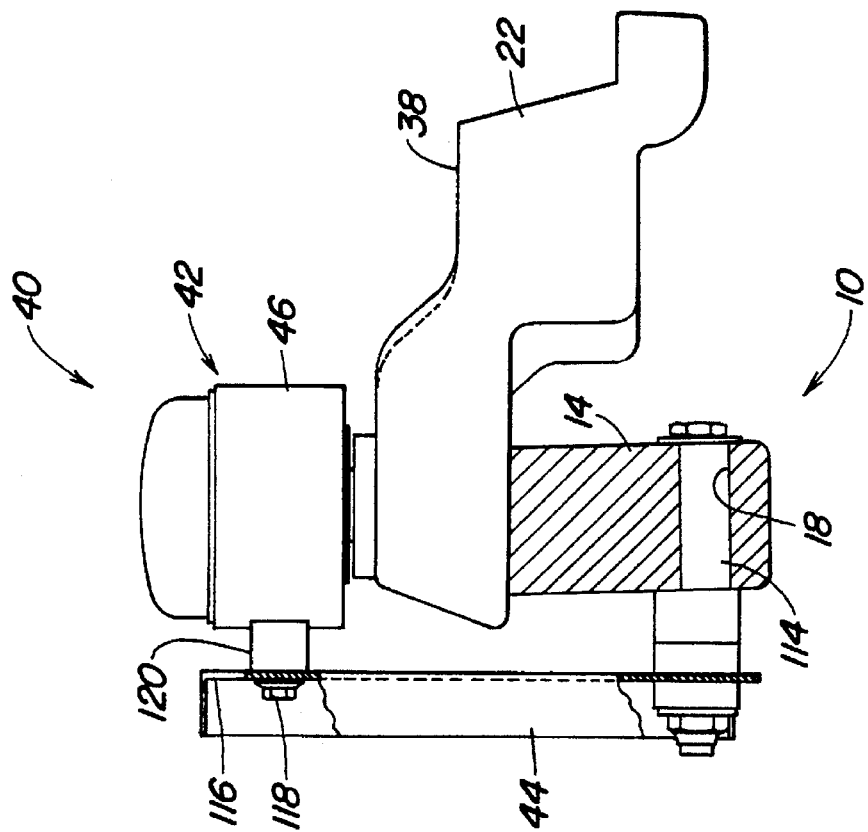
FIG. 2 is a side view, partially in section, of the axle knee portion of FIG. 1.
Figure 1:
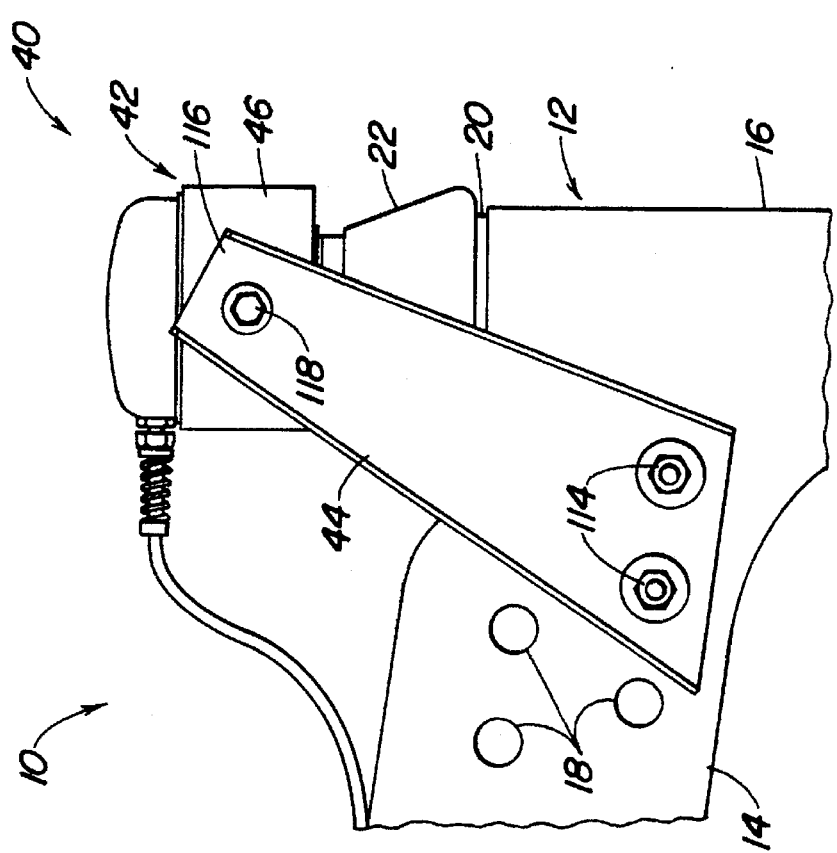
FIG. 1 is front view of a portion of the axle knee portion of a steerable axle assembly with a rotary transducer mounting assembly.
Figure 3:
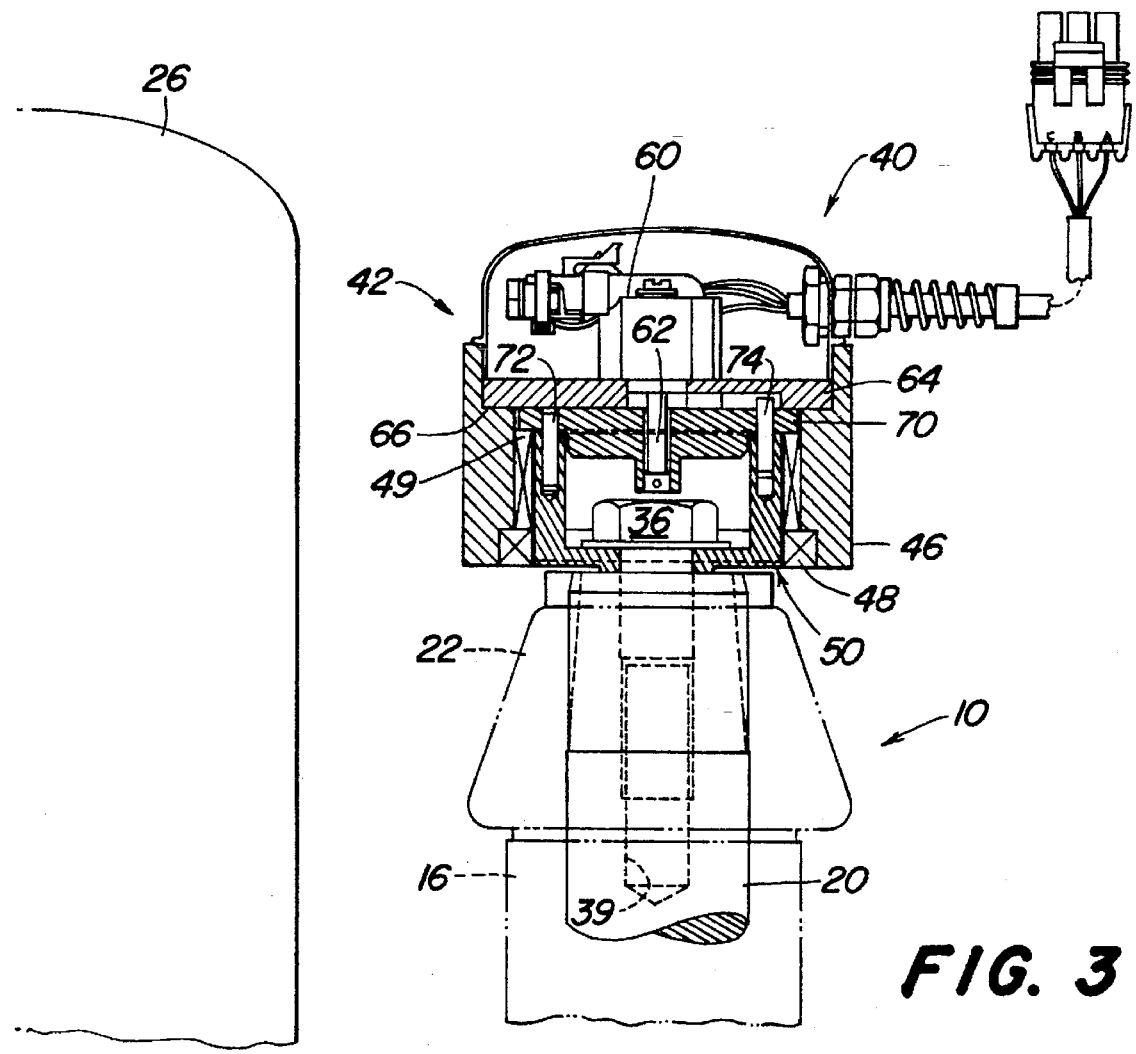
FIG. 3 is an enlarged rear view of a portion of the axle assembly of FIG. 1, partially in section to better show the mounting assembly.

Referring now to FIGS. 1–3, therein is shown a portion of a conventional extension axle assembly 10 having a guide axle knee 12 with a horizontal section 14 leading into an upright journal 16. The assembly 10 is fabricated as a heavy cast iron piece with a series of transversely spaced adjustment holes 18 and is supported from a center axle member (not shown) by bolts which extend through selected holes 18 and corresponding holes in the center axle member.

Figure 7:
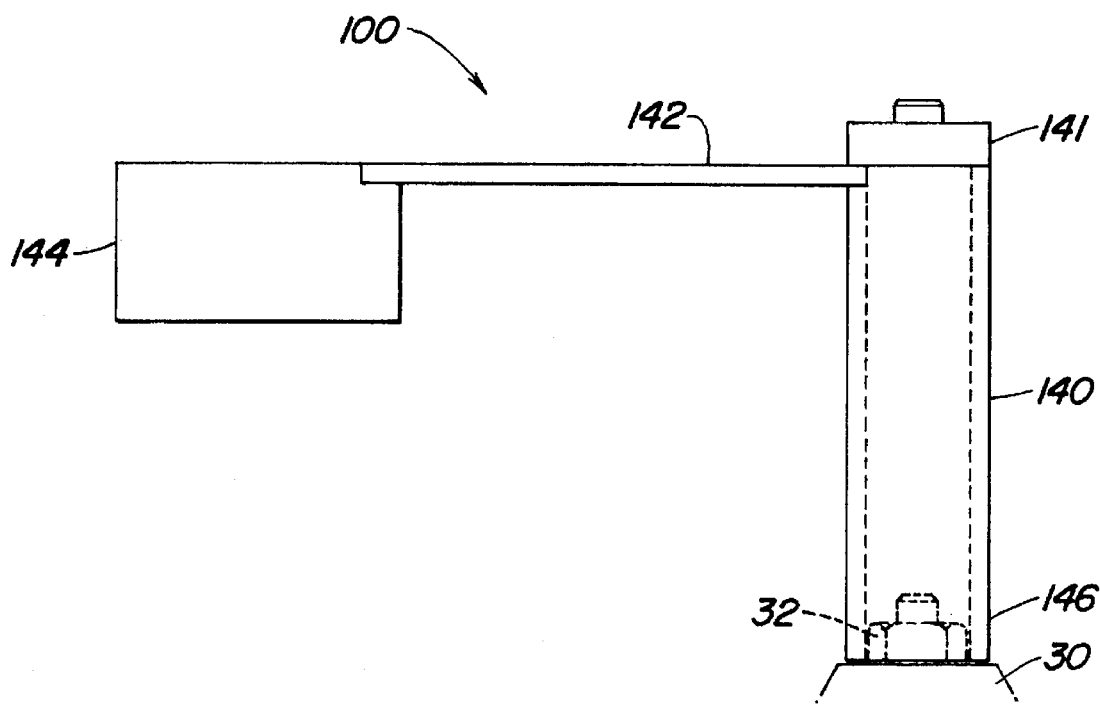
FIG. 7 is a side view of the fixture shown in FIG. 6.

A spindle or kingpin 20 is rotatably supported in the journal 16. A steering arm 22 is fixed to the upper end of the spindle 20, and a steerable wheel 26 is journalled for rotation about a generally horizontal axis at the lower end of the spindle. The outer end of a tie rod assembly 30 is connected by a bolt 32 (FIG. 7) to the radially outermost portion of the steering arm 22, and the opposite end of the assembly 30 is connected to a bell crank (not shown). As best seen in FIG. 3, a spindle bolt 36 is threaded into a bore located on the axis of the spindle 20 to help secure the steering arm 22 to the upper end of the spindle 20. A steering cylinder (not shown) may be connected to the steering arm 22 at location 38 to rotate the spindle 20 about its axis.

To provide a signal dependent on steerable wheel position, a transducer assembly 40 including housing structure 42 is supported above the steering arm 22 by a bracket 44 connected to the guide axle knee 12. The housing structure includes a hollow cylindrical main body 46 with a annular seal 48 and a roller bearing 49 located above the seal 48.

Figures 4, 5:
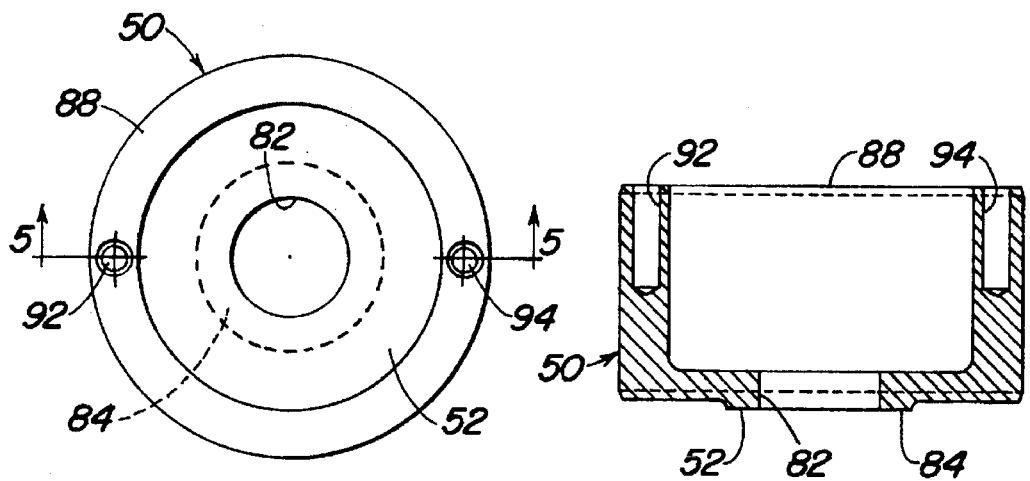
FIG. 4 is a top view of the journal portion of the transducer mounting assembly.
FIG. 5 is a sectional view of the journal portion taken along lines 5—5 of FIG. 4.

The transducer assembly 40 also includes a separate journal 50 which is connected by the spindle bolt 36 for rotation with the spindle 20 about the spindle axis. The journal 50 as shown in FIGS. 4 and 5 has a cylindrical, cup-shaped configuration opening upwardly with an apertured bottom 52. The journal 50 is rotatably received by the bearing 49 with the periphery of the bottom 52 in contact with the seal 48.

A rotary potentiometer 60 with a downwardly directed rotatable shaft 62 is mounted on a slotted disk 64 (FIG. 3) supported on a shoulder 66 located in the main body 46 above the bearing 49. The shaft 62 is fixed for rotation with a circular member 70 supported for rotation in the housing structure 42 between the roller bearing 49 and the disk 64. Opposed indexing pins 72 and 74 depend from the member 70. The pin 74 extends upwardly above the member 70 into the slot of the disk 64 for preventing rotation of the shaft 62 beyond a normal operating range of the potentiometer 60.

Figure 6:
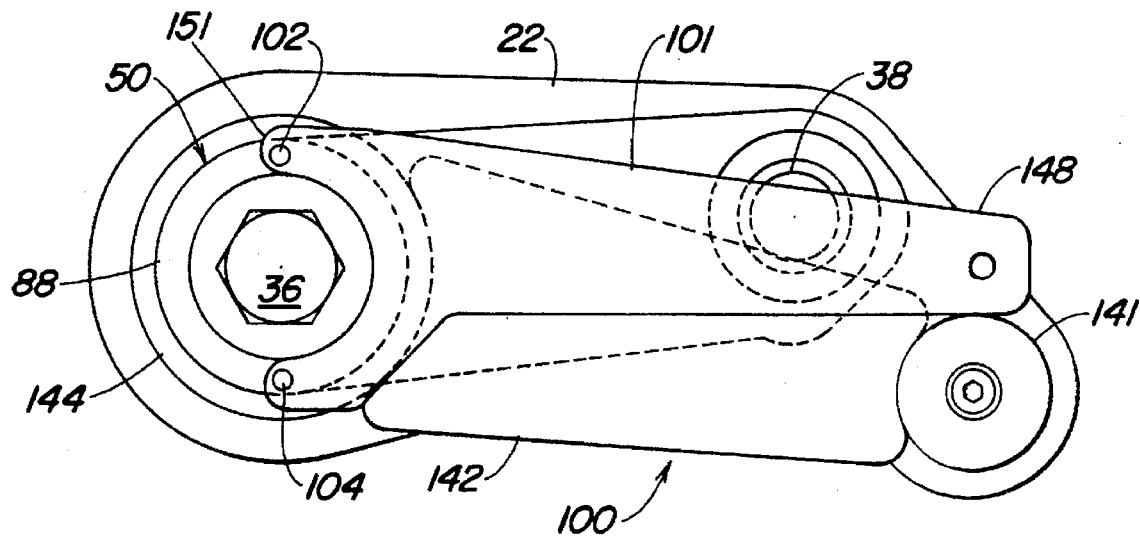
FIG. 6 is a top view of the fixture and wrench utilized during assembly to align a portion of the transducer mounting.

As best seen in FIGS. 3–5, the journal 50 has a central aperture 82 with a slightly downwardly projecting shoulder 84. The journal 50 has a generally planar upper edge 88, and a pair of bores 92 and 94 extend downwardly into the cylindrical sidewalls of the journal to receive the pins 72 and 74, respectively. The spindle bolt 36 is first removed, and the shoulder 84 is positioned against the top of the spindle 20 so that the aperture 82 aligns with the threaded bore 38. The bolt 36 is then inserted through the aperture 82 and threaded loosely into the bore 39. Special alignment structure 100 (FIGS. 6 and 7), described in detail below, is positioned relative to the steering arm 38, and an wrench 101 with pins 102 and 104 inserted in the journal bores 92 and 94 angularly position the journal 50 relative to the spindle 20. With the journal 50 angularly located by the wrench 101, the spindle bolt 36 is tightened by a socket wrench (not shown) inserted downwardly through the open end of the wrench 101 to secure the journal 50 for rotation with the spindle 20 about the axis of the spindle.

After the journal 50 is secured to the spindle 20, the housing structure 42 is attached by sliding the seal 48 and bearing 49 down over the outer cylindrical surface of the journal so that the pins 72 and 74 enter the bores 92 and 94, respectively. The bracket 44 (FIGS. 1 and 2), which is channel-shaped opening outwardly from the axle knee 12, is secured by bolts 114 with the rear planar wall generally parallel to the knee and with an upper and outwardly projecting connecting portion 116 located adjacent the main body 46 of the housing structure. A bolt 118 is inserted through the connecting portion 116 and is threaded into a support 120 fixed to and projecting radially from the body 46 to nonrotatably support the housing structure 42 from the knee at a preselected location relative to the journal 50, as shown in FIGS. 2 and 3. The pins 72 and 74 constrain the member 70 and potentiometer shaft 62 for rotation with the journal 50 and spindle 20 about the spindle axis. The potentiometer 60, which is connected by a standard wiring harness 130 to a processor (not shown) on the vehicle, provides a variable signal determined by the rotational position of the shaft 62 which in turn is determined by the steered position of the wheel 26. The alignment structure 100 helps assure accurate positioning of the journal 50 and of the shaft 62 relative to the spindle 20 so that centering and calibration of the potentiometer is facilitated.

Referring now again to FIGS. 6 and 7, the alignment structure 100 includes an upright tubular member 140 having an upper end 141 fixed to and extending slightly above a radially extending plate 142. The outer end of the plate 142 is fixed to an open-ended cylindrical member 144 which is slidably positioned over the journal 50 during assembly prior to tightening of the spindle bolt 36. During assembly the journal 50 is free to rotate within the member 144. The tubular member 140 includes an open lower end 146 adapted to receive the upwardly projecting portion of the bolt 32 so that the member is located relative to the steering arm 22 and the spindle 20. The wrench 101 is generally planar with a C-shaped end 151 opening outwardly and supporting the downwardly projecting pins 102 and 104 which are inserted in the bores 92 and 94. The wrench 101 has a radially projecting handle 148 located just above the plate 142 and adapted to contact the upper end 141 (FIG. 6) to thereby angularly locate and retain the journal 50 accurately within a narrow range of positions while the bolt 36 is tightened. Once the bolt 36 is tightened to fix the journal 50 relative to the spindle 20, the alignment structure 100 and wrench 101 are lifted from the steering arm 22 and the journal.

Having described the preferred embodiment, it is to be understood that various modifications of the structure may be made without departing from the scope of the invention as set forth in the claims which follow.

We claim:

1. In a steerable wheel axle assembly for an agricultural implement, the axle assembly having a frame, a spindle member supported by the frame and rotatable about an upright axis, and a steerable wheel connected to the spindle member for rotation about the axis to steer the wheel, mounting structure for connecting a feedback transducer to provide a signal dependent on steerable wheel position, the mounting structure comprising:

a first member having a bearing surface generally conforming to a cylindrical surface and connected to the spindle member, the first member rotatable about the upright axis as the steerable wheel is steered;

a bearing member rotatably receiving the first member;

a support for nonrotatably mounting the bearing member on the frame with the cylindrical member journalled in the bearing member; and a rotary transducer carried by the support and operably connected to the first member for rotation relative to the bearing member.

2. The invention as set forth in claim 1 further including a spindle bolt connected to the uppermost portion of the spindle member, wherein the first member is connected by the bolt to the spindle member.

3. The invention as set forth in claim 1 wherein the first member comprises an upwardly opening cup-shaped member having a bottom portion connected to the spindle member.

4. The invention as set forth in claim 3 wherein the cup-shaped member has a top portion with indexing structure, and the rotary transducer includes structure mating with the indexing structure.

5. The invention as set forth in claim 3 further including a spindle bolt connected to an upper portion of the spindle member, and wherein the cup-shaped member includes an apertured bottom portion receiving the spindle bolt therethrough.

6. The invention as set forth in claim 5 wherein the spindle bolt is threadable into the spindle member to secure the apertured bottom portion to the spindle member for rotation of the bearing surface with the spindle bolt about the upright axis.

7. The invention as set forth in claim 6 including alignment structure selectively matable with the cup-shaped member for temporarily retaining the cup-shaped member in a preselected position as spindle bolt is threaded into the spindle member to thereby position the rotary transducer within a preselected range of positions relative to the support.

8. In a steerable wheel axle assembly for an agricultural implement, the axle assembly having a frame, a spindle member supported by the frame and rotatable about an upright axis, and a steerable wheel connected to the spindle member for rotation about the axis, transducer structure providing a signal dependent on steerable wheel position, the transducer structure comprising:

a transducer assembly having a housing structure and a rotary member journalled in the housing structure, the transducer assembly providing a variable output signal dependent upon the rotational position of the rotary member relative to the housing structure;

a journal connected to the spindle member for rotation with the spindle member about the upright axis;

a bracket connected to the axle frame for nonrotatably supporting the housing structure above the spindle member with the journal rotatably received within the housing structure; and means connecting the rotary member for rotation with the journal relative to the housing structure.

9. The invention as set forth in claim 8 further including a spindle bolt connected to the spindle member, wherein the journal is connected by the bolt to the spindle member.

10. The invention as set forth in claim 8 wherein the journal comprises an upwardly opening cup-shaped member having a bottom portion connected to the spindle member.

11. The invention as set forth in claim 10 wherein the cup-shaped member has a top portion with indexing structure, and the rotary member includes structure mating with the indexing structure for constraining the rotary member to rotate in unison with the journal.

12. The invention as set forth in claim 10 further including a spindle bolt connected to an upper portion of the spindle member, and wherein the cup-shaped member includes an apertured bottom portion receiving the spindle bolt therethrough.

13. The invention as set forth in claim 12 wherein the spindle bolt is threadable into the spindle member to secure the apertured bottom portion to the spindle member for rotation of the journal with the spindle bolt about the upright axis, and further including alignment structure selectively matable with the cup-shaped member for temporarily retaining the cup-shaped member in a preselected angularly rotated position as spindle bolt is threaded into the spindle member to thereby establish the angular position the cup-shaped member within a preselected range of positions relative to the spindle member.

14. The invention as set forth in claim 10 including a seal supported between the bottom portion of the cup-shaped member and the housing structure, and a roller bearing located in the housing above the seal.

15. In a steerable wheel axle assembly for an agricultural implement, the axle assembly having a frame, an upright spindle member including a spindle bolt, the spindle member supported by the frame and rotatable about an upright axis, a movable steering arm assembly fixed to the spindle member, a wheel connected to the spindle member and steerable by movement of the steering arm assembly, and a transducer for providing a signal dependent on steerable wheel position, transducer structure comprising:

a selectively positionable transducer portion adapted for mounting on the spindle member by the spindle bolt; and a fixture selectively supported by the steering arm assembly for positioning the transducer portion relative to the spindle member as the transducer is mounted on the spindle member.

16. The invention as set forth in claim 15 wherein the fixture includes an attachment portion supported by the steering arm assembly when the transducer portion is mounted on the spindle member.

17. The invention as set forth in claim 16 wherein the steering arm assembly includes a threaded bolt, and wherein the attachment portion is located by the bolt when the transducer portion is mounted on the spindle member.

18. The invention as set forth in claim 15 wherein the transducer portion includes locating structure, and further including means for positioning the locating structure relative to the steering arm assembly.

19. The invention as set forth in claim 18 wherein the means for positioning the locating structure includes a wrench selectively connectible to the locating structure for rotating the transducer portion to a preselected rotated position relative to the spindle member.

20. The invention as set forth in claim 15 wherein the transducer portion includes an apertured portion and the spindle bolt is inserted through the apertured portion and tightened against the transducer portion while the fixture positions the transducer portion.

* * * * *